Figure 3:
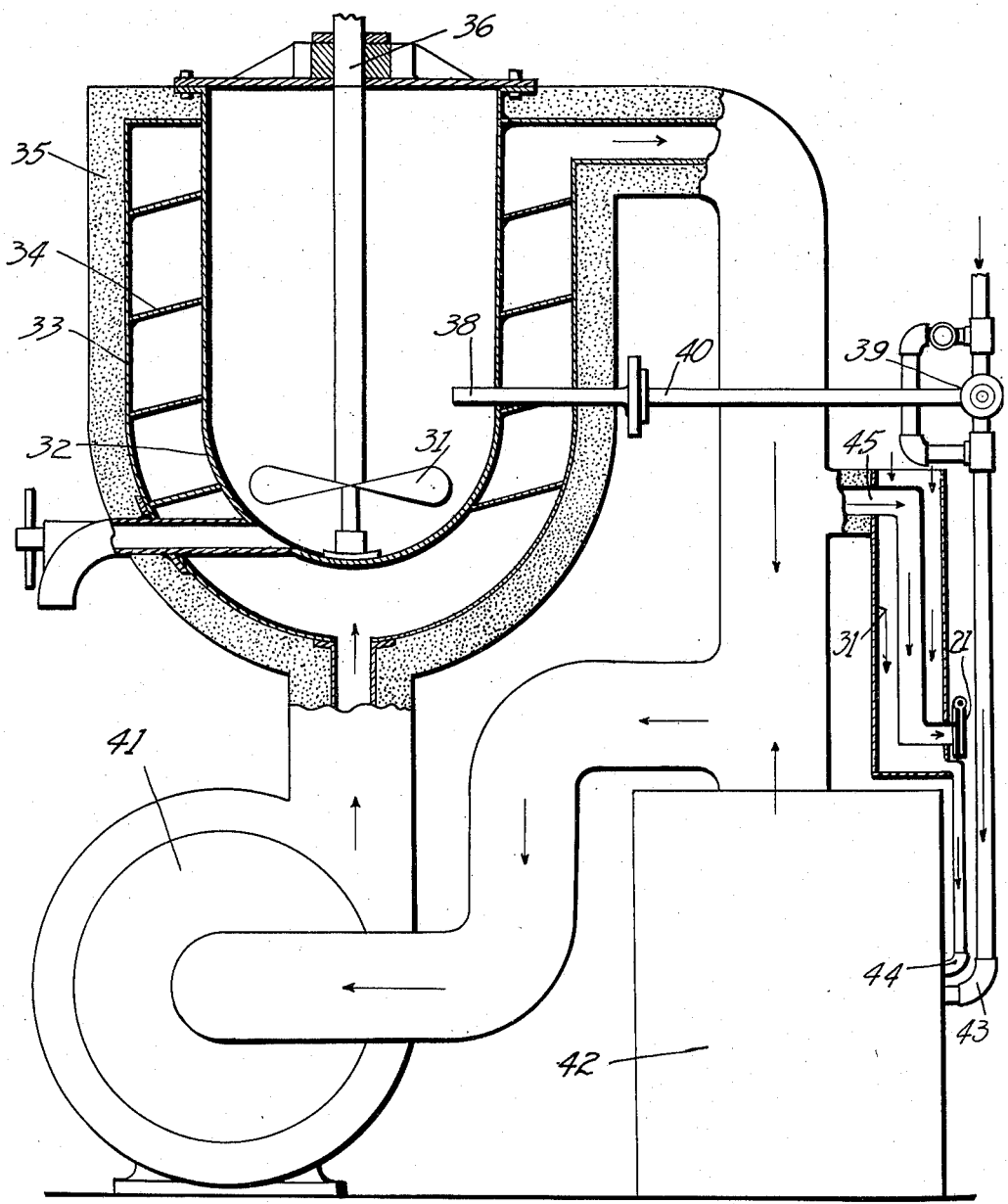

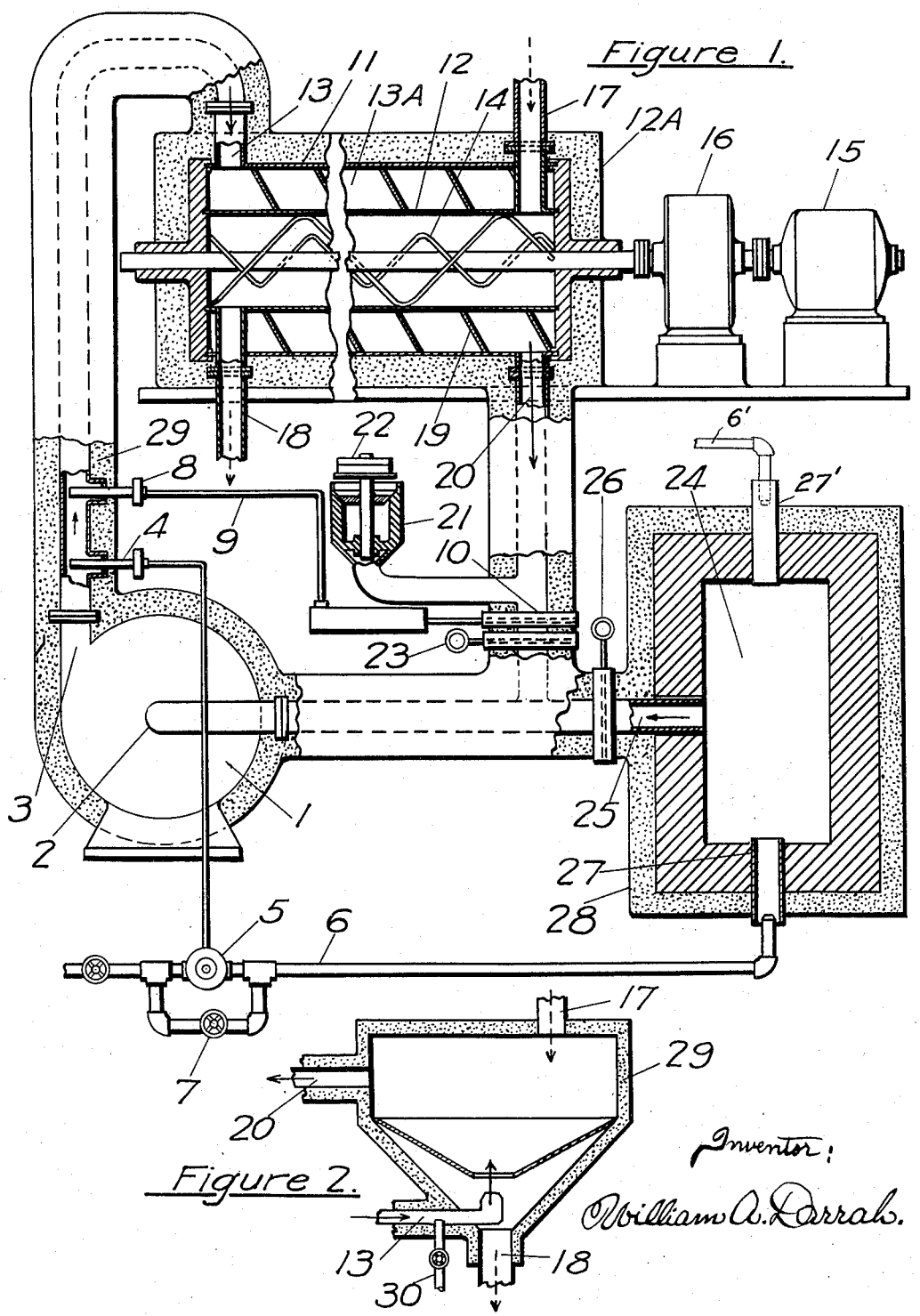

Patented Jan. 27, 1925.

1,524,340

UNITED STATES PATENT OFFICE.

WILLIAM A. DARRAH, OF CHICAGO, ILLINOIS.

PROCESS OF HEAT APPLICATION AND APPARATUS THEREFOR.

Application filed May 24, 1923. Serial No. 641,160.

*To all whom it may concern:*

Be it known that I, WILLIAM A. DARRAH, a citizen of the United States, residing at Chicago, in the county of Cook and State of Illinois, have invented a new and useful Improvement in Processes of Heat Application and Apparatus Therefor, of which the following is a specification.

The invention relates to methods and apparatus for applying, transferring, utilizing and controlling heat for carrying out various industrial processes.

The object of the invention is to provide a simple, efficient, economical equipment and method for accomplishing the results referred to above.

A specific application of the process and apparatus which forms the basis of this invention, consists in the manufacture of dextrine from starch. It should be understood, however, that this particular application is only one of a very great number, and will be chosen in this specification as a specific means of describing one form of the equipment and process.

In general, it may be stated that wherever it is desirable to utilize heat in an industrial process, some form of the equipment or process which forms the basis of this invention may be utilized. For example, it is common today to use various forms of steam jackets, circulating oil systems, hot water systems, etc., for applying heat in such processes as cooking various materials, vulcanizing, and in the manufacture of various articles of food, soap, chemical products, etc.

Many modifications of the apparatus and process shown and described will be apparent to those skilled in the art.

Referring to the drawing, Figure I. shows schematically and partly in section, one form of my invention as applied to the manufacture of dextrine. It will be obvious that in place of the dextrinizer shown, a great many other applications may be made, with minor changes, without departing from the spirit of this invention.

Figure II. shows schematically a slightly modified means of applying heat.

Figure III. shows schematically a slightly modified form of this device, in which the heat is applied to an upright kettle, such as a varnish kettle or candy kettle. The controlling thermostat is inserted into the interior of the kettle and a heat interchanger is provided around the exhaust outlet.

Referring to Figure I., (1) indicates a blower having an intake (2) and outlet (3). The blower may be of any suitable type, depending upon the temperatures of operation and the pressures required. Ordinarily a fan type of blower, with provision for cooling the bearings, is desirable.

A thermostat (4) is placed in the outlet line (3) of blower (1), the control of said thermostat (4) being arranged to open or close pilot valve (5) on gas main (6), which correspondingly increases or decreases the heat produced by the gas burner (27), thus controlling the temperature of the circulating air.

(7) Represents a valve arranged to bypass thermostatically controlled valve (5).

An additional thermostat (8) is placed in the discharge line (3), the control tube (9) from thermostat (8) serving to operate thermostatically controlled gate valve (10), as will be later described.

Discharge line (3) from blower (1) enters shell (11) of the heat using equipment (12ᴬ) by connection (13).

In the case at hand, the heat using equipment (12ᴬ) is shown to consist of the shell (12) within which a double screw (14) is caused to rotate by motor (15) operating through gear reduction (16). Material is fed into the heat using device by inlet tube (17), while outlet tube (18) serves to discharge the said material.

For purposes of illustration, the heat utilizing equipment is one of the commercial forms used for forming dextrine from starch, but it should be understood that this particular device may be used for any other purpose, and also that the device shown is merely for purposes of illustration, as the same method and equipment for applying heat may be used in a great many other cases.

Baffles (19) are disposed in the shell (11) around heat using device (12) in such a manner that the heated air entering at (13) circulates helically around container (13ᴬ). After circulating around container (13ᴬ) the heated air leaves by the tube (20) which contains a relief valve (21) provided with adjusting means (22) which are shown here as weights but which may obviously consist of springs, or any other desired mechanism. Discharge tube (20) is also provided with a thermostatically controlled blast gate (10) the purpose of which will be later described. The combustion chamber or heater (24) is connected through pipe (25) containing blast gate (26), to return air tube (2) of blower. Combustion chamber (24) is provided with burners (27) and (27¹) which are supplied with fuel (gas, oil, powdered coal, etc.) through mains (6) and (6¹). Valves (5 and 7) control burner (27) as previously discussed. Combustion chamber (24) is provided with an insulating layer (28), and in the same way, the blower, tube, heat utilizing device, and other equipment are provided with heat insulating layer (29).

In operation the blower (1) is started in motion, being driven by a motor, engine, or other suitable source of power, which is not shown and which forms no part of this invention. The air from blower (1) circulates helically around container (13ᴬ) and the major portion of it returns to blower (1) through tube (20) and intake tube (2) as shown. Thermostat (4) maintains burner (26) in operation at such times as the temperature of the air circulating around shell (13ᴬ) is too low for satisfactory operation. It will be obvious that thermostats (4 or 8) either or both, may be placed in tube (20) instead of tube (3) as shown. The products of combustion from burner (26), which are formed in combustion chamber (24), are drawn into intake tube (2) by the suction of blower (1). The relative amount of combustion gases which is drawn into blower (1) is determined in part by blast gate (23) and in part by blast gate (10). In starting the device in operation, blast gate (10) should be open and blast gate (23) should be partly closed, which would mean that a certain accumulation of pressure would build up in tube (20) which would cause relief valve (21) to open, thus allowing a portion of the circulating air to escape, the escaping portion being made approximately equal to the volume of the products of combustion drawn into the system from combustion chamber (24). When thus adjusted it will be apparent that the system will circulate approximately a given volume of gases, automatically exhausting or rejecting a sufficient amount to compensate for the new products of combustion which are used to maintain the temperature constant.

It will also be apparent that by making thermostat (8) operate on the inverse principle, that is, causing thermostat (8) to close blast gate (10) when the temperature becomes too low, automatic provision will be supplied for exhausting a greater portion of the circulating gases and thus compensating for the new combustion gases which are added.

It will be apparent that blast gate (23) may be utilized to perform some of the functions of as well as in addition to relief valve (21).

In operating equipment of the class described, I have found that gas, oil, or powdered coal may be used to advantage as the combustible material to produce heat in combustion chamber (24). Natural gas or city gas is the simplest and easiest material to control and has many operating advantages but of course involves a higher cost. Fuel oil, however, is an economical, inexpensive fuel in many localities, and gives excellent results.

It will be apparent that inasmuch as the products of combustion are taken bodily into the circulating gases, that the efficiency of heat transfer is extremely high, the only losses aside from radiation being those due to rejected gases which pass out through relief valve (21). It is entirely feasible to enclose relief valve (21) in a heat interchanger shown in dotted lines by numeral (31), and the air which is used for combustion purposes in chamber (24) may be passed through the heat interchanger (31), thus giving extremely high efficiencies.

The above arrangement is shown diagrammatically in Figure III., in which (32) represents the container to be heated, (33) the surrounding shell provided with helical flues, (34), and covered with insulation (35). (36) indicates the shaft of the agitating mechanism (37). (38) indicates the end of the thermo couple which operates thermostatic valve (39) through control tube (40). (41) indicates the blower and (42) indicates the combustion chamber.

The circulating system is substantially the same in Figure III as in Figure I. (43) indicates the fuel supply line to combustion chamber (42), while (44) indicates the air supply line. The exhaust outlet (45) from the circulating system carries the discarded products of combustion to relief valve (21) through heat interchanger (31). Air used for combustion purposes in combustion chamber (42) travels in the direction shown by the arrows through heat interchanger (31) and pipe (44) into combustion chamber (42), thus conserving some of the heat which would otherwise be lost. The arrows shown on the pipes through which the circulating gases travel indicate the direction of motion of these gases. It will be noted that thermostat (38) in this case is controlled by the temperature of the material being heated instead of by the temperature of the circulating gases.

Another advantage of this system is the close control which is obtainable due partly to the relatively low heat capacity of the circulating medium (air or other gases) and partly to the high velocity with which they travel.

It should be understood that while air is referred to in a generic way as the circulating medium, any desired circulating medium may be used, such as steam (water vapor), nitrogen, carbon dioxide, or mixtures of various gases. In general, however, air will be found to be most practical and is very effective.

The relative velocity and temperature of the circulating medium will of course be different for various conditions. In general it is desirable to have a velocity in the neighborhood of 1000 ft. per minute over the surface to be heated. Velocities higher than this are desirable and effective but frequently involve too much resistance to the flow of air. The difference in temperature between the incoming and outgoing air will depend upon the materials to be treated, their temperature, their heat conductivity, and other factors. In many operations such as the manufacture of dextrine, a total temperature difference of less than 10 degrees between the incoming and outgoing air is often obtained.

It will be apparent from the above, that in addition to providing an extremely economical and efficient means of heat transfer, the method and equipment here described allows a close and accurate control, and permits operation at practically any desired temperature. It will be apparent in the case of systems which utilize steam under high pressure, that to secure temperatures in the neighborhood of 500 degrees F. will involve extermely high pressures which are uneconomical and hazardous. In the same way, oil is definitely limited by its upper safe operating temperature. Circulating water is of course much more limited than either steam or oil, and less effective. In the case of my equipment, however, I can without difficulty secure and maintain temperatures ranging from slightly over 100 degrees F. to considerably in excess of 1000 degrees F., with equal facility. At the upper ranges of temperatures it is frequently advisable to utilize non-oxidizing materials, but aside from this feature the rest of the equipment would be unchanged. Temperatures from 400 to 700 degrees F. are simple to obtain and hold using my equipment.

Another modification of this invention, which will be apparent from the description given herein, consists in placing either thermostat (4) or thermostat (8), or both, within the shell (13A), or otherwise in contact with the material to be heated, so that the temperature of the circulating gases will be controlled directly by the temperature of the material being heated. Obviously, the result here obtained will be substantially similar to the result secured when the thermostat is placed in the air circulating line, providing proper compensation is made for the temperature drop through the shell and other parts of the apparatus.

The modification shown in Figure II. provides by pipe (30) for the introduction of steam or other vapors into the circulating heated air or gases which in this case come in direct contact with the material to be heated.

In constructing the heat application device which forms the subject of this invention, it is convenient to place combustion chamber (24) as close as possible to pipe (2) in order that the hot gases may enter the circulating system as directly as possible. In order to prevent undue suction on combustion chamber (24), thus introducing possibilities of drawing in an excess of cold air or of impairing combustion, it is of advantage to provide blast gate (26) connecting from chamber (24) to intake (2). By throttling down blast gate (26) the resistance to the passage of gases from combustion chamber (24) to conduit (2) is increased. This results in re-circulating a greater portion of gases returned from pipe (20), therefore reducing the suction on combustion chamber (24).

When a substantially constant operating condition is secured after the apparatus is first erected, it is of course not necessary to make continuous adjustments of blast gate (26).

In constructing the equipment which forms the subject of this invention I have found it advantageous to construct combustion chamber (24) so that it has a relatively large volume. The combustion chamber thus serves as a reservoir or storage space for the hot gases. A construction of this kind permits more uniform operating conditions than if the thermostat (4) which controls the combustion at burner (27) is relied on exclusively.

Having now fully described my invention, what I claim is new and wish to secure by Letters Patent in the United States is as follows:

1. The method of applying heat which consists in continuously recirculating a controlled quantity of a mixture containing products of combustion and air, said mixture being maintained at a controlled temperature in contact with the apparatus to be heated, by the controlled addition of hot products of combustion.

2. The method of applying heat which consists in continuously circulating a volume of heated gases under pressure, continuously exhausting a controlled quantity of said gases and continuously taking into the circulating gases a sufficient quantity of hot products of combustion to maintain the temperature at any desired value.

3. In the process of applying heat, the steps of continuously automatically discarding a controlled portion of circulating gases and replacing them by a sufficient quantity of hot products of combustion to maintain the desired temperature.

4. The method of regulating temperatures which consists in adding to a constantly circulating portion of heated gases a controlled portion of hotter products of combustion and automatically rejecting a compensating portion of the cooler circulating gases.

5. The method of heat application which consists in circulating gases under controlled temperature conditions at a high velocity in contact with the material to be heated, recirculating the major portion of said circulating gases, rejecting a portion of said circulating gases, and adding a new portion of hotter products of combustion, said new portion of products of combustion being sufficient in volume to maintain the temperature of said circulating gases at the desired value.

6. The method of heating a device which consists in continuously recirculating the major parts of a volume of hot gases through said device and simultaneously and continuously exhausting a controlled portion of said circulating gases and substituting for said exhausted portion a portion of hotter products of combustion.

7. The method of heating a device which consists in continuously circulating a volume of hot gases in contact with the device to be heated, continuously rejecting a controlled portion of said gases after they have given a part of their heat to said device to be heated, continuously recirculating the remainder of said gases and continuously substituting for said exhausted portion of said circulating gases a new portion of products of combustion and mixing said new portion of products of combustion with the recirculated volume of circulating gases.

WILLIAM A. DARRAH.